R. B. PRICE.
TREATMENT OF MATERIALS.
APPLICATION FILED OCT. 9, 1912.

1,132,971.

Patented Mar. 23, 1915.

Witnesses
Edwin L. Jewell
A. L. Mills

Inventor
Raymond B. Price
By Percy B. Hills
Attorney

UNITED STATES PATENT OFFICE.

RAYMOND B. PRICE, OF MISHAWAKA, INDIANA.

TREATMENT OF MATERIALS.

1,132,971.  Specification of Letters Patent.  Patented Mar. 23, 1915.

Application filed October 9, 1912. Serial No. 724,874.

*To all whom it may concern:*

Be it known that I, RAYMOND B. PRICE, a citizen of the United States, residing at Mishawaka, in the county of St. Joseph, State of Indiana, have invented new and useful Improvements in the Treatment of Materials, of which the following is a specification.

My invention relates to the manufacture of articles formed either of fabric and plastic settable materials, or of layers or sections of plastic material alone, and has for its object to provide an improved process of building up or assembling the same whereby an article will be produced containing a minimum of air, moisture and the like which is ordinarily entrapped between the layers or sections of the materials used in forming the article. And my invention further contemplates the production of a completed article of the character described wherein the layers or sections of the materials themselves will have been treated, prior to their being assembled, to eliminate therefrom as far as possible air, moisture and the like. It will be understood that the production of an article possessing these characteristics may be accomplished by employing various forms of apparatus, and that any number of different articles, such as tires, rubber boots and shoes, hose, and in fact practically all articles wherein rubber forms a component part may be so produced. Nor is the invention intended to be limited to articles containing rubber, as it is my object to employ the same in connection with the manufacture of linoleum, as well as in the manufacture of such articles as oil skins and the like, the scope of my invention being in no sense limited in any particular as to the article being made provided the same is susceptible of, and may be improved by, my improved process.

Figure 1:
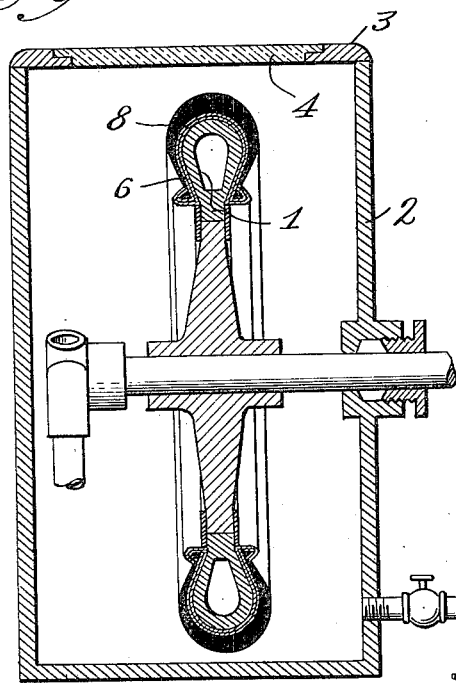
Figure 2:
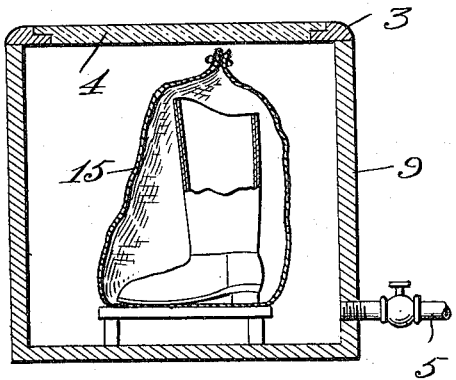
Figure 3:
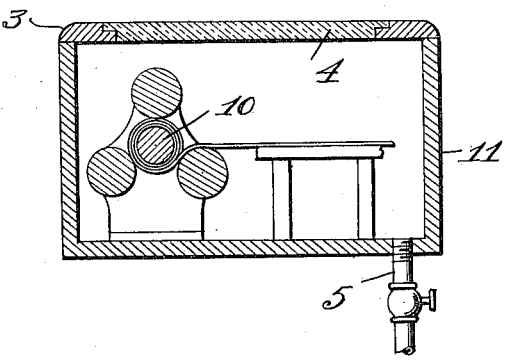
Figure 4:
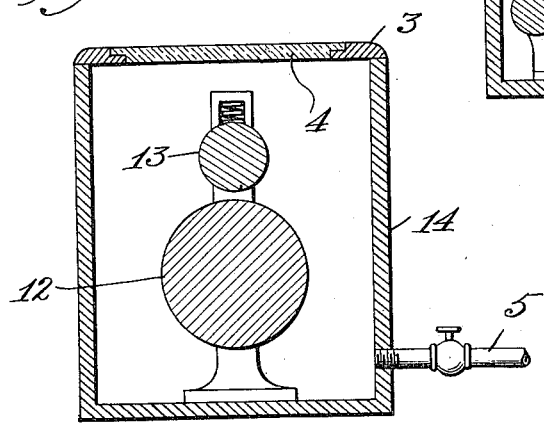

In the accompanying drawing: Figure 1 is a vertical sectional view of an apparatus for carrying out my invention in connection with the manufacture of automobile tire shoes. Fig. 2 is a similar view illustrating an apparatus for carrying out my invention in connection with the manufacture of rubber boots and shoes. Fig. 3 is a similar view illustrating an apparatus for carrying out my invention in connection with the manufacture of hose. Fig. 4 is a similar view illustrating an apparatus for carrying out my invention in connection with the plying up of articles.

In the said drawing, referring more particularly to Fig. 1, the same represents at 1 the core of a tire building machine of any conventional type, the same being mounted to be freely rotated in the usual manner. Surrounding and inclosing said core is a casing 2 formed air tight, and having a suitable cover at 3 at the top thereof, in which is removably disposed a plate of glass 4. Tapped into one side of the casing 2 is a pipe 5, which is to be connected with any suitable exhausting apparatus, whereby a vacuum may be exerted upon the interior of the casing 2.

My invention contemplates the building up of the usual layers of fabric 6, the breaker strip, not shown, and the rubber 8 while the core 1 is disposed within the casing 2, and while there is exerted upon the interior of said casing a vacuum through the pipe 5. The result of so building or assembling the component parts of a tire shoe in this manner is that all danger of the formation of air pockets between the layers of material while being assembled is most effectually obviated.

In Fig. 2 I have shown the same principle applied to the manufacture or assembly of a rubber boot, the inner fabric and the outer layer or layers of rubber being brought together in their proper relative positions on the form while in the casing 9, and while there is exerted upon said casing a vacuum, as described with respect to Fig. 1.

In Fig. 3 I have shown the same principle applied to the manufacture of hose, wherein the mandrel 10 upon which the material is built, together with the rollers by which it is operated to wind thereon the fabric, are inclosed within a casing 11, upon which the vacuum described with respect to Figs. 1 and 2 is applied.

In Fig. 4 I have illustrated a conventional plying machine, embodying a drum 12 and the usual yielding roller 13, the same being inclosed within a casing 14, to which the vacuum described with respect to Figs. 1, 2 and 3 is applied while the plies of material, whether of fabric and rubber or layers of rubber alone, are built up thereon while said vacuum is being exerted thereon. And it will be understood that I contemplate building up articles formed of layers or plies of such material as fabric or rubber or both, without employing any specific mechanism other than an air tight inclosing casing, whereby a vacuum may be exerted upon the material while in the act of being built up in plies or layers.

In Fig. 2 I have shown at 15 an air tight flexible bag or closure surrounding the built up boot or shoe. The function of this bag or closure is to protect from any danger of the admission of air into the body of same when the vacuum in chamber 9 is first broken. It will be understood that said closure is to be disposed around the boot or shoe after the same has been built up, and is to be sealed at its mouth, so that when the vacuum in chamber 9 is broken, and there is an inrush of air at atmospheric pressure said closure will effectually prevent any direct contact between the air and the boot or shoe, the result being that said air pressure will instantly compact the layers of material forming the boot or shoe upon its form. This action being completed the closure 15 is to be removed from the boot or shoe and the latter subjected to the usual vulcanizing step in its process of manufacture.

Where the articles formed in any of the manners hereinbefore described embody as an element a settable material, the building up of the article must necessarily be followed by the setting step in the process. Thus, for instance, in the manufacture of articles containing rubber there must be a subsequent vulcanization of the built-up article, and in order that said article may be subjected to an even temperature in its vulcanizing chamber I contemplate breaking the vacuum by admitting preheated gas or other medium at a temperature high enough to complete the vulcanizing operation, the result being that as said gas or other vulcanizing medium relieves the vacuum it will penetrate every point in the chamber and will thus establish an even temperature throughout the same. And I contemplate employing this step alone of the process in connection with vulcanizers adapted to treat a plurality of articles at one operation, such as boots and shoes, in order that there may be established and maintained an even temperature throughout the vulcanizer during the vulcanizing operation. I accomplish this result by first charging the vulcanizer with the boots or shoes to be vulcanized, then establishing a vacuum in said vulcanizer, and finally relieving said vacuum by the admission of a gas preheated to produce a vulcanizing temperature, which results in the vulcanizer being completely filled with a vulcanizing medium at an even temperature, and at any desired pressure, below, at or above atmospheric.

It is well known that there is an established relation between pressure and temperature, and due recognition must be made of this fact in order to properly carry out the various steps of the process hereinbefore described.

If desired I may subject the articles being built up as hereinbefore described to the action of the vacuum while also exposed to a heating action produced in any suitable manner. It will be obvious that by thus heating the articles any gases entrapped therein will be correspondingly expanded and thus more readily removable by means of the vacuum, while the consistency of plastic materials such as rubber and the like will be correspondingly affected by the heat. And I also contemplate the application of cold to certain articles, which will be found to be particularly advantageous where the plastic material is of a sticky consistency, the lower temperature rendering it more easily manipulated by reducing its sticky characteristic or stiffening the material.

There are certain articles which from their construction lend themselves to the ready removal of entrapped air, gases and the like, and with this class of articles I contemplate applying the vacuum thereto after the article has been built up, the action of the vacuum under such conditions being sufficient to withdraw therefrom the entrapped air and the like. In order that there may be no reëntry of air into the article when the vacuum is broken I prefer to provide means, which may or may not be automatic in operation, for permanently sealing the sources of air egress in the article after the application of the vacuum thereto and before said vacuum is broken.

It is obvious that when rubber cement containing naphtha or similar material is employed between the layers of the material forming the article, the action thereon of the vacuum will be to effectually remove said naphtha, this action being facilitated, as will be understood by the application of heat.

I contemplate applying the broad principle of my present invention to apparatus for molding articles, by subjecting the mold when filled with the material, or while being filled, or both, to the action of a vacuum, which may be exerted thereon by surrounding the same with a chamber capable of being closed air tight, or by any other suitable means. And this operation may be carried on in connection, or not, with any of the other steps as to the treatment of the material hereinbefore described. It will be understood, however, that this step of subjecting material in a mold to the action of a vacuum may be used in connection with material not amenable to some of the steps hereinbefore described.

Having just described my invention, what I claim as new and desire to secure by Letters Patent is:

1. The method of manufacturing articles of vulcanizable plastics consisting in creating a vacuum about an article while it is being formed, whereby the exposed superficial area thereof will be subjected to the action of a reduced pressure to withdraw fluids from the material and thereafter subjecting the aforesaid exposed superficial area of said article to the action of a vulcanizing medium.

2. The method of manufacturing articles of vulcanizable plastics consisting in superimposing a plurality of layers of the plastic material one upon another while subjecting the article as it is being formed to the action of a vacuum, whereby the exposed superficial area thereof will be subjected to a reduced pressure to withdraw fluids from the material, and thereafter subjecting said article to the action of a vulcanizing medium.

3. The method of manufacturing articles of vulcanizable plastics consisting in superimposing a plurality of layers of the plastic material one upon another while subjecting the article as it is being formed to the action of a vacuum whereby the exposed superficial area thereof will be subjected to a reduced pressure to withdraw fluids from the material, and thereafter breaking the vacuum by the admission of a vulcanizing medium about the article so formed.

4. The method of manufacturing articles of vulcanizable plastics consisting in superimposing a plurality of layers of the plastic material one upon another while subjecting the article as it is being formed to the action of a vacuum whereby the exposed superficial area thereof will be subjected to a reduced pressure to withdraw fluids from the material, inclosing the completely built up article in an envelop impervious to gases while maintaining the reduced pressure, thereafter subjecting said envelop to external pressure, and subsequently removing said article from said envelop and subjecting it to the action of a vulcanizing medium.

5. The method of manufacturing articles of vulcanizable plastics consisting in subjecting the article to the action of a vacuum whereby the exposed superficial area thereof will be subjected to a reduced pressure to withdraw fluids from the material, inclosing the article in a collapsible envelop impervious to gases while maintaining the reduced pressure, subjecting said envelop to external pressure, and finally vulcanizing the article.

In testimony whereof I have hereunto set my hand this 4th day of October, 1912, in the presence of two subscribing witnesses.

RAYMOND B. PRICE.

Witnesses:
 EUGENE T. HARTIGAN,
 PERCY B. HILLS.